United States Patent
Al-Ahdal et al.

(10) Patent No.: US 12,442,725 B2
(45) Date of Patent: Oct. 14, 2025

(54) AUTOMATED VACUUM SAMPLING SYSTEM AND METHODS RELATED THERETO

(71) Applicant: SAUDI ARABIAN OIL COMPANY, Dhahran (SA)

(72) Inventors: Ahmad Mohammad Al-Ahdal, Dhahran (SA); Hadi A. Al-Shehri, Dhahran (SA); Majed I. Al-Sulaiman, Dhahran (SA); Abdultif A. Alzuraiq, Dhahran (SA); Obaid Halban Al-Otaibi, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 393 days.

(21) Appl. No.: 18/296,274

(22) Filed: Apr. 5, 2023

(65) Prior Publication Data
US 2024/0219270 A1 Jul. 4, 2024

Related U.S. Application Data

(60) Provisional application No. 63/477,498, filed on Dec. 28, 2022.

(51) Int. Cl.
*G01N 1/14* (2006.01)
*G01N 1/22* (2006.01)

(52) U.S. Cl.
CPC ............. *G01N 1/14* (2013.01); *G01N 1/2247* (2013.01); *G01N 2001/1418* (2013.01)

(58) Field of Classification Search
CPC ............... G01N 1/14; G01N 1/2247; G01N 2001/1418; G01N 2001/205;
(Continued)

(56) References Cited

U.S. PATENT DOCUMENTS 4,823,622 A * 4/1989 Nohl ................. G01N 1/28
73/864.22
5,251,495 A * 10/1993 Kuhner ............... G01N 1/2035
73/863.71

(Continued)

OTHER PUBLICATIONS

Jacobs Process Analytics; Vacuum Control Panel, retrieved from https://jacobsanalytics.com/vacuum-control-panel/, Sep. 2022.

*Primary Examiner* — Robert R Raevis
(74) *Attorney, Agent, or Firm* — Vorys, Sater, Seymour and Pease LLP

(57) ABSTRACT

An automated vacuum sampling system comprising: a compressor in fluid communication with an upstream process line; downstream of the compressor, an inlet control valve; downstream of the inlet control valve, a sampling cylinder that includes an inlet quick-fitting valve and an outlet quick-fitting valve at either end of the cylinder, wherein an inlet quick-fitting valve is in fluid communication with the inlet control valve and the outlet quick-fitting valve is in fluid communication with an outlet control valve; a downstream tubing line fluidly connects the outlet control valve to a downstream process line; and, a control system communicably coupled to and programmed to operate the compressor, the inlet control valve, and the outlet control valve. Wherein, once the sampling cylinder is in place, the control system first opens the inlet control valve, then opens the outlet control valve, then starts the compressor, then closes the outlet control valve, and then stops the compressor and closes the inlet control valve.

16 Claims, 2 Drawing Sheets

(58) Field of Classification Search
CPC ......... G01N 2001/2064; G01N 1/2035; G01N 1/22; G01N 2001/2071
USPC ............................ 73/863.01, 863.71, 863.83
See application file for complete search history.

(56) References Cited

U.S. PATENT DOCUMENTS

| | | | |
|---|---|---|---|
| 7,513,171 B2* | 4/2009 | Coyle | G01N 1/4022 73/863.22 |
| 2007/0056394 A1* | 3/2007 | Coleman | B01L 5/02 141/54 |

* cited by examiner

AUTOMATED VACUUM SAMPLING SYSTEM AND METHODS RELATED THERETO

FIELD OF THE DISCLOSURE

The present disclosure relates generally to fluid sampling and, more particularly, to an automated vacuum sampling system for use in the oil and gas industry.

BACKGROUND OF THE DISCLOSURE

Sampling and analysis of chemical processes in the oil and gas industry involves taking numerous aliquots of a process fluid (e.g., gaseous or liquid hydrocarbons, such as crude oil and natural gas) and performing a variety of tests related to, for example, product composition and quality, product contamination (e.g., impurities), water composition, and compliance with government regulations. The results of such analyses may be used in both diagnostic and preventative operations.

Vacuum sampling is of particular interest because it can reduce or eliminate environmental contamination of an aliquot taken during the sampling process. Conventionally, vacuum sampling is performed using a sampling needle. In such conventional procedures, a sample line extends from a process stream in an oil and gas facility and the opposing end of the sample line connects to a sampling needle. A valve prevents or permits flow to the sampling needle, which itself is used to create a vacuum when the valve is open and the needle plunger is withdrawn to obtain a process fluid sample within the needle barrel. Once the process sample is obtained, the valve is closed and the sampling needle unconnected from the sample line. However, process fluid may remain within the portion of the sample line between the closed valve and the end of the sample line when it is no longer connected to the sampling needle, which can create hazards to the environment, sampling personnel, and equipment within the oil and gas facility, resulting in significant health, safety, and economic risks. For example, if a process fluid includes a gaseous stream that comprises toxic gases, such as hydrogen sulfide, then personnel may be accidentally exposed to that hazardous gas. In such instances, conventional vacuum sampling using a sampling needle, as described above, results in release/leakage of toxic gases into the atmosphere, posing significant risks. There is a need for a vacuum sampling system that eliminates the risk of toxic gas release or leakage during a sampling process.

With respect to the aforementioned considerations, the present disclosure provides an automated vacuum sampling system for use in the oil and gas industry operated by a multi-sequence controller installed in a control panel and including a safety shutoff component, which eliminates release or leakage of process fluids (e.g., toxic gases) during a sampling process.

SUMMARY OF THE DISCLOSURE

Various details of the present disclosure are hereinafter summarized to provide a basic understanding. This summary is not an exhaustive overview of the disclosure and is neither intended to identify certain elements of the disclosure, nor to delineate the scope thereof. Rather, the primary purpose of this summary is to present some concepts of the disclosure in a simplified form prior to the more detailed description that is presented hereinafter.

According to an embodiment consistent with the present disclosure, a vacuum sampling system is provided comprising a compressor in fluid communication with an upstream process line through an upstream tubing line that connects the upstream processing line to the compressor; downstream of the compressor, an inlet control valve; downstream of the inlet control valve, a sampling cylinder that includes an inlet quick-fitting valve and an outlet quick-fitting valve at either end of the cylinder, wherein an inlet quick-fitting valve is in fluid communication with the inlet control valve and the outlet quick-fitting valve is in fluid communication with an outlet control valve; a downstream tubing line fluidly connects the outlet control valve to a downstream process line; a control system communicably coupled to and programmed to operate the compressor, the inlet control valve, and the outlet control valve, wherein, once the sampling cylinder is in place, the control system first opens the inlet control valve, then opens the outlet control valve, then starts the compressor, then closes the outlet control valve, and then stops the compressor and closes the inlet control valve.

According to a further embodiment consistent with the present disclosure, a method of operating an automated vacuum sampling system is provided comprising a method of operating an automated vacuum sampling system comprising: placing a sampling cylinder in between an inlet control valve and an outlet control valve; wherein, upstream of the inlet control valve is a compressor in fluid communication with an upstream process line and wherein, the outlet control valve is in fluid communication with a downstream process line; wherein the inlet control valve, the compressor, and the outlet control valve controlled by a control system communicably coupled to and programmed to operate the compressor, the inlet control valve, and the outlet control valve; then opening the inlet control valve, then opening the outlet control valve, then starting the compressor to purge material from the upstream process line through to the downstream process line; then closing the outlet control valve to fill the sampling cylinder with material from the upstream process line, then stopping the compressor and closing the inlet control valve to remove the fluid connection between the inlet control valve, the sampling cylinder, and the outlet control valve.

Any combinations of the various embodiments and implementations disclosed herein can be used in a further embodiment, consistent with the disclosure. These and other aspects and features can be appreciated from the following description of certain embodiments presented herein in accordance with the disclosure and the accompanying drawings and claims.

DETAILED DESCRIPTION

Figure 1:
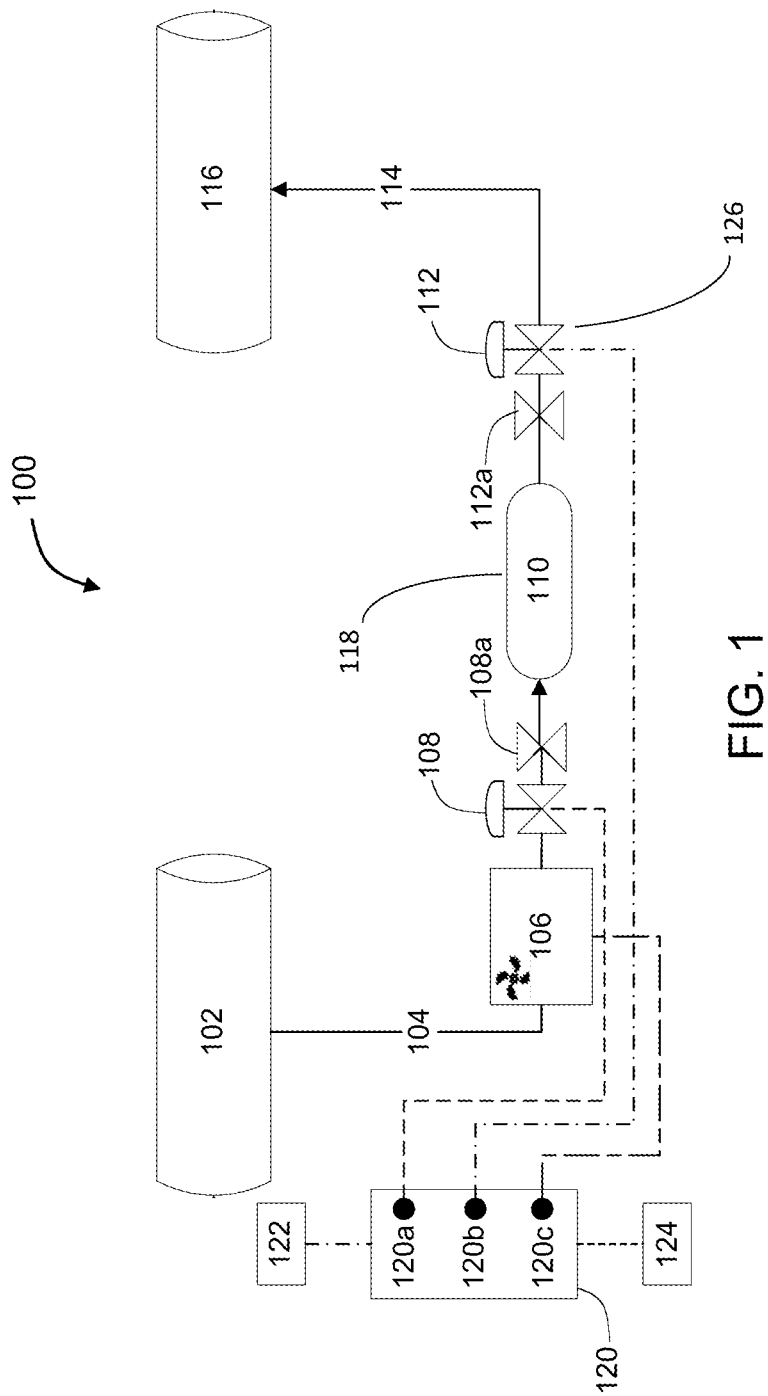
FIG. 1 is a schematic of an example of a sampling cylinder and control apparatus according to the present invention.

Embodiments of the present disclosure will now be described in detail with reference to the accompanying Figures. Like elements in the various figures may be denoted by like reference numerals for consistency. Further, in the following detailed description of embodiments of the present disclosure, numerous specific details are set forth in order to provide a more thorough understanding of the claimed subject matter. However, it will be apparent to one of ordinary skill in the art that the embodiments disclosed herein may be practiced without these specific details. In other instances, well-known features have not been described in detail to avoid unnecessarily complicating the description. Additionally, it will be apparent to one of ordinary skill in the art that the scale of the elements presented in the accompanying Figures may vary without departing from the scope of the present disclosure.

Embodiments in accordance with the present disclosure generally relate to fluid sampling and, more particularly, to an automated vacuum sampling system for use in the oil and gas industry. The automated vacuum sampling (AVS) system of the present disclosure provides a fully-automated sample collecting tool operated by a multi-sequence controller installed in a control panel and can further be utilized for low-pressure process streams (e.g., less than about 5 pounds per square inch (PSIG)), where a compressor (e.g., a compacted rotary gas compressor) generates the required flow to fill a sampling cylinder from a discharge line in one or more process streams. The AVS system is enclosed and prevents current vacuum sampling risks associated with the release of toxic compounds (e.g., toxic gases) and, if a leak does occur, the AVS system is equipped with detectors that are designed to cease operation of the compressor and close valves allowing process flow into the sampling cylinder from the discharge line.

As described below, the AVS system comprises at least a tubing network, a multi-sequence controller, motor-operated valving that are ingress protected per standard IP-46 such that they do not generate energy sufficient to generate sparks and cause fire, a compressor, a sampling cylinder, a leak detection system, and a timer system. The multi-sequence control system operates the motor-operated valving and the compressor. The leak detection system provides an intrinsic fail-safe mechanism through interaction with the multi-sequence control system to shut down the compressor and close the motor-operated valving to prevent toxic leakage from the AVS system.

Definitions

As used herein, the term "vacuum sampling," and grammatical variants thereof, refers to sampling of a process fluid in an oil and gas processing operation under vacuum conditions or near vacuum conditions, wherein near-vacuum conditions refers to less than about 5 pounds per square inch (PSIG), which may be particularly useful for low-pressure streams of process fluid and for eliminating or reducing environmental contamination.

As used herein, the terms "process fluid," and grammatical variants thereof, refers to a gas, a liquid, and a combination thereof (e.g., an emulsion or a liquid-gas mixture) obtained from a process stream as part of an oil and gas processing operation. Examples of fluids that can be sampled using the automated vacuum sampling system of the present disclosure include, but are not limited to, crude oil, natural gas, and any combination thereof.

As used herein, the term "processing operation," and grammatical variants thereof, refers to the processing of crude oil (e.g., distillation, hydrotreatment, catalytic reforming, isomerization, coking, catalytic cracking, and the like), natural gas (e.g., condensate and water removal, acid gas removal, dehydration, mercury and nitrogen removal, separation, fractioning, and the like), or any combination thereof.

As used herein, the term "tubing network," and grammatical variants thereof, refers to a conveyance or transfer line of any composition capable of flowing a process fluid within a process stream as part of an oil and gas processing operation. Such conveyances may include, but are not limited to, downstream pipelines, for example.

As used herein, the term "control panel," and grammatical variants thereof, refers to a structural component for accommodating instruments for the purpose of measurement, monitoring, detecting, and/or controlling of a process (i.e., the AVS sampling system of the present disclosure). The control panel houses the multi-sequence controller described herein and may permit physical manipulation of the multi-sequence controller (e.g., physical buttons, switches, touch screen, and the like), remote or virtual manipulation of the multi-sequence controller (e.g., using a computer), and any combination thereof.

As used herein, the term "multi-sequence controller" (or simply "controller"), and grammatical variants thereof, refers to one or both of a hardware device and/or a software program that manages information flow between at least two entities or devices, such as the compressor, motor-operating valving, and leak detection system of the AVS system described herein.

As used herein, the term "compressor," and grammatical variants thereof, refers to an instrument or device that increase the pressure of a fluid (e.g., a gas, such as air) by reducing its volume. Examples of suitable compressors for use in the AVS system of the present disclosure may include, but are not limited to, vacuum compacted gas compressors that are operable to compress a process fluid for vacuum sampling, where the process fluid may be at low pressure, such as less than 5 PSI or between about 1 PSI and about 5 PSI or about 3 PSI to about 5 PSI, encompassing any value and subset therebetween, or is otherwise placed under vacuum.

As used herein, the term "motor-operated valving," and grammatical variants thereof, refers to valves actuated between closed and opened positions by electrical (e.g., solenoid) motors. Examples of suitable motor-operated valving for use in the AVS system of the present disclosure may include, but are not limited to, motor-operated gate valves, motor-operated butterfly valves, motor-operated ball valves, and any combination thereof.

As used herein, the term "leak detection system," and grammatical variants thereof, refers to one or more sensors incorporated into the AVS system described herein and communicable to the controller for operating the compressor and motor-operated valving upon detection of low levels (and high levels) of toxic compounds. In particular, the leak detection system comprises a sensor for detecting one or both of hydrogen sulfide gas ($H_2S$) and lower explosive limit (LEL) of hazardous levels of combustible gas or solvent vapor. For example, the leak detection system can detect $H_2S$ at parts per million (ppm) levels, such as in the range of 0 ppm to about 100 ppm, encompassing any value and subset therebetween, and LEL levels at concentrations in the range of 0% LEL to about 500% LEL, encompassing any value and subset therebetween, and may preferably communicate to the multi-sequence controller to cease operation of the compressor and motor-operated valving meeting or exceeding about 10% LEL.

As used herein, the term "sampling cylinder," and grammatical variants thereof, refers to a container designed to capture and safely transport a process fluid for testing (e.g., compositional testing). The sampling cylinder of the AVS system of the present disclosure has first and second opposing ends that are each in fluid communication with a motor-operated valve, as described below. While described generally in terms of a cylinder, one of ordinary skill in the art will recognize that other three dimensional shapes for sequestering liquids and gases may be suitable.

As used herein, the term "timer system," and grammatical variants thereof, refers to one or more timer controls incorporated into the AVS system described herein and communicable to the controller for operating the compressor and motor-operated valving to control purging, sample collection, and isolation, as described below.

Automated Vacuum Sampling (AVS) System and Methods Related Thereto

Referring to FIG. 1, illustrated is an example AVS system 100 according to one or more embodiments of the present disclosure. As shown, the AVS system 100 includes a tubing/line network 102, 104, 114, and 116. While shown as a vessel for simplicity, reference 102 refers to an upstream process operation line or vessel (hereinafter process line) containing the fluid in the processing unit to be sampled. The upstream process line 102 may be located at a wellsite or a processing facility and receive a process fluid from a wellbore, pipeline, and the like. It is to be appreciated, however, that while upstream process line 102 appears as a separate element flow (e.g., tubing, conveyance, or pipeline, and the like) in FIG. 1, the upstream process line 102 and upstream tubing line 104 may be contiguous, without departing from the scope of the present disclosure. Upstream tubing line 104 is in fluid communication which extends from the upstream process line 102 for receiving a portion of the process fluid therein. The upstream tubing line 104 is also in fluid communication with compressor 106, and flow out of compressor 106 is controlled by inlet control valve 108.

When a process sample is desired, a sampling cylinder 110 is put into place between inlet control valve 108 and outlet control valve 112. Sampling cylinder 110 is attached to upstream tubing line 104 using quick-fitting safety valves, shown as 108a and 112a. Inlet control valve 108 separates the cylinder 110 and quick-fitting safety valve 108a from compressor 106 and upstream tubing line 104. Similarly, outlet control valve 112 separates the sampling cylinder 110 and quick-fitting safety valve 112a from compressor 106 and downstream tubing line 114. The quick-fitting valves operate such that when the sampling cylinder is in place between inlet control valve 108 and outlet control valve 112, quick-fitting valves 108a and 112a are open, and when sampling cylinder is removed the valves automatically close.

Figure 2:
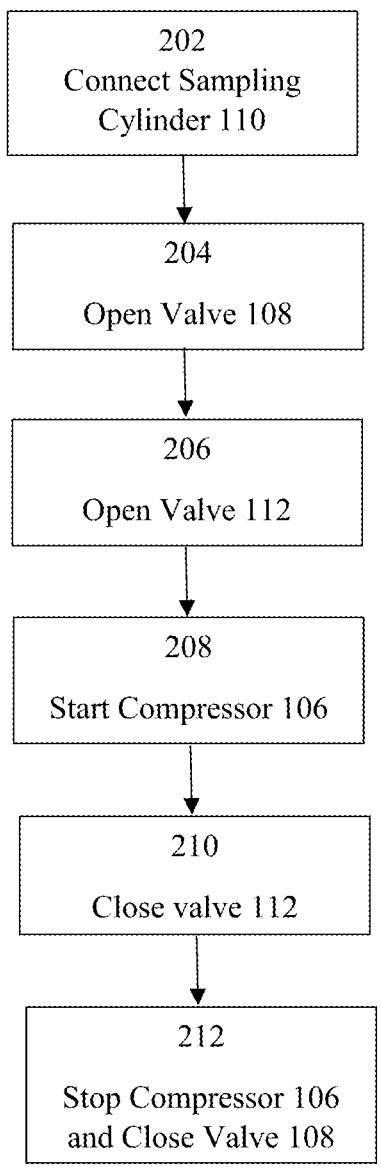
FIG. 2 is a schematic of a method of sampling according to the present invention.

When a sample is needed, and after sampling cylinder 110 is placed into position, a control program operates compressor 106 and valves 108 and 112 to safely obtain a sample. The operation of the control program is shown symbolically in FIG. 1 as control system 120. As shown, first button 120a operates inlet control valve 108 (inlet/suction), second button 120b operates outlet control valve 112 (outlet/discharge), and third button 120c operates compressor 106. The basic operating of the sampling procedure them proceeds as shown in FIG. 2.

To obtain a sample, the first step 202 is connecting sampling cylinder 110. Once in place, step 204 opens inlet control valve 108 using first button 120a (shown in FIG. 1), and then step 206 opens outlet control valve 112 using second button 120b (shown in FIG. 1). After step 206, sampling cylinder 110 is now in fluid communication between upstream tubing line 104 and downstream tubing line 114; however, due to the vacuum or low pressure associated with upstream process line 102, a compressor is needed to obtain a useful sample. Thus, once outlet valve 112 is opened, compressor 106 is turned on using third button 120c (shown in FIG. 1). Once compressor 106 is turned, the system will begin to purge material from upstream process line 102 through sampling cylinder 110 and out of outlet control valve 112. After a set amount of purging time, the control system 120 will close outlet control valve 112 using second button 120b, trapping the process material in sampling cylinder 110. The control system 120 then monitors the pressure within sampling cylinder 110 using pressure gauge 118, which communicates with control system 120 through first control system input 122. Once the pressure within sampling cylinder 110 reaches a predetermined set point, the control system 120 will close inlet control valve 108 using first button 120a and turn off the compressor using third button 120c. At this point, the desired sample is contained within sampling cylinder 110 and is isolated from upstream tubing line 104 and downstream tubing line 114 by control valves 108 and 112, respectively. At that point, the operator can simply remove sampling cylinder 110 using just the quick-fitting safety valves 108a and 112a.

The "set amount of purging time" may be set as needed dependent on the process line being sampled. By way of example, a time of about 5 minutes may be suitable for most process conditions. However, in other cases where, for example, upstream tubing line 104 spans a longer distance between process operation line or vessel to be sampled (102) and sampling cylinder 110, a longer purge time than 5 minutes may be desired to ensure that the process fluid has had time to fill sampling cylinder 110. In other cases, where the process operation line or vessel to be sampled (102) is under less than vacuum conditions and/or very close to the sampling cylinder 110, a shorter purge time than 5 minutes may be desired to avoid losing excess process fluid to the flare.

The "predetermined set point" for the pressure within sampling cylinder 110 that shows that sample collection is complete will depend on the processes being sampled and the design of the sampling cylinder 110 and surrounding operational components (valves, vessels, etc.). By way of example, the "predetermined set point" for the pressure within sampling cylinder 110 may be set to 5 PSIG, but it will be understood that the set point may vary from, for example, 1 PSIG up to 10 PSIG.

The phrase "shown symbolically," when referring to control system 120 means that while reference is made to "pushing button a" or "pushing button c," it will be understood be one of ordinary skill in the art that while actuators will be needed to operate valves 108 and 112 and a starting/stopping signal to compressor 106, the entire operation may be achieved by pressing a single button that runs the entire operation described above.

As for material that enters downstream tubing line 114, it proceeds either to downstream process line 116 that may proceed to further processing or, more likely, to a flare system.

In addition to the control systems discussed above, further safety operations may be desirable for operation of the AVS system 100. Such additional safety operations may include one or more detectors 126 at valve 112. These detectors 126 can interface with control system 120 through second control system input 124. By way of example, where the material being sampled contains flammable material, detector 126 may be a Lower Explosive Limit (LEL) detector. Further, where flammable or explosive materials may be present, it may be desirable to ensure that the valving are ingress protected per standard IP-46 such that they do not generate energy sufficient to generate sparks. Or, where a potentially harmful substance such as hydrogen sulfide (H₂S) may be present, detector 126 may be an H₂S detector. Of course, in some circumstances, other detectors or more than one detector may be utilized at detector 126.

Embodiments disclosed herein include:

A. An automated vacuum sampling system comprising: a compressor in fluid communication with an upstream process line through an upstream tubing line that connects the upstream processing line to the compressor; downstream of the compressor, an inlet control valve; downstream of the inlet control valve, a sampling cylinder that includes an inlet quick-fitting valve and an outlet quick-fitting valve at either end of the cylinder, wherein an inlet quick-fitting valve is in fluid communication with the inlet control valve and the outlet quick-fitting valve is in fluid communication with an outlet control valve; a downstream tubing line fluidly connects the outlet control valve to a downstream process line; a control system communicably coupled to and programmed to operate the compressor, the inlet control valve, and the outlet control valve, wherein, once the sampling cylinder is in place, the control system first opens the inlet control valve, then opens the outlet control valve, then starts the compressor, then closes the outlet control valve, and then stops the compressor and closes the inlet control valve.

Embodiment A may have one or more of the following additional elements in any combination:

Element A1: wherein the control system is able to monitor and control the time between opening the outlet control valve and starting the compressor.

Element A2: wherein the control system is able to monitor and control the time between starting the compressor and closing the outlet control valve.

Element A3: wherein there is a pressure gauge monitoring the pressure within the sampling cylinder and wherein stopping the compressor and closing the inlet control valve is based on the pressure within the sampling cylinder.

Element A4: wherein there is a detector at or near the outlet control valve.

Element A5: wherein there is a detector at or near the outlet control valve and wherein the detector monitors for a lower explosive limit, a potentially harmful substance, or a combination thereof.

Element A6: wherein the inlet control valve and the outlet control valve are selected to minimize or eliminate sparking upon operation.

Element A7: wherein the downstream process line connects to a flare system.

By way of non-limiting example, exemplary combinations applicable to Embodiment A include any one, more, or all of Elements A1-A7 without limitation.

B. A method of operating an automated vacuum sampling system comprising: a method of operating an automated vacuum sampling system comprising: placing a sampling cylinder in between an inlet control valve and an outlet control valve; wherein, upstream of the inlet control valve is a compressor in fluid communication with an upstream process line and wherein, the outlet control valve is in fluid communication with a downstream process line; wherein the inlet control valve, the compressor, and the outlet control valve controlled by a control system communicably coupled to and programmed to operate the compressor, the inlet control valve, and the outlet control valve; then opening the inlet control valve, then opening the outlet control valve, then starting the compressor to purge material from the upstream process line through to the downstream process line; then closing the outlet control valve to fill the sampling cylinder with material from the upstream process line, then stopping the compressor and closing the inlet control valve to remove the fluid connection between the inlet control valve, the sampling cylinder, and the outlet control valve.

Embodiment B may have one or more of the following additional elements in any combination:

Element B1: wherein the control system is able to monitor and control the time between opening the outlet control valve and starting the compressor.

Element B2: wherein the control system is able to monitor and control the time between starting the compressor and closing the outlet control valve.

Element B3: wherein there is a pressure gauge monitoring the pressure within the sampling cylinder and wherein stopping the compressor and closing the inlet control valve is based on the pressure within the sampling cylinder.

Element B4: wherein there is a detector at or near the outlet control valve.

Element B5: wherein there is a detector at or near the outlet control valve and wherein the detector monitors for a lower explosive limit, a potentially harmful substance, or a combination thereof.

Element B6: wherein the inlet control valve and the outlet control valve are selected to minimize or eliminate sparking upon operation.

Element B7: wherein the downstream process line connects to a flare system.

By way of non-limiting example, exemplary combinations applicable to Embodiment B include any one, more, or all of Elements B1-B7 without limitation.

The terminology used herein is for the purpose of describing particular embodiments only and is not intended to be limiting of the invention. As used herein, for example, the singular forms "a," "an," and "the" are intended to include the plural forms as well, unless the context clearly indicates otherwise. It will be further understood that the terms "contains," "containing," "includes," "including," "comprises," and/or "comprising," and variations thereof, when used in this specification, specify the presence of stated features, integers, steps, operations, elements, and/or components, but do not preclude the presence or addition of one or more other features, integers, steps, operations, elements, components, and/or groups thereof.

Terms of orientation used herein are merely for purposes of convention and referencing and are not to be construed as limiting. However, it is recognized these terms could be used with reference to an operator or user. Accordingly, no limitations are implied or to be inferred. In addition, the use of ordinal numbers (e.g., first, second, third, etc.) is for distinction and not counting. For example, the use of "third" does not imply there must be a corresponding "first" or "second." Also, if used herein, the terms "coupled" or "coupled to" or "connected" or "connected to" or "attached" or "attached to" may indicate establishing either a direct or indirect connection, and is not limited to either unless expressly referenced as such.

While the disclosure has described several exemplary embodiments, it will be understood by those skilled in the art that various changes can be made, and equivalents can be substituted for elements thereof, without departing from the spirit and scope of the invention. In addition, many modifications will be appreciated by those skilled in the art to adapt a particular instrument, situation, or material to embodiments of the disclosure without departing from the essential scope thereof. Therefore, it is intended that the invention not be limited to the particular embodiments disclosed, or to the best mode contemplated for carrying out this invention, but that the invention will include all embodiments falling within the scope of the appended claims. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

The invention claimed is:

1. An automated vacuum sampling system comprising:
a compressor in fluid communication with an upstream process line through an upstream tubing line that connects the upstream processing line to the compressor;
downstream of the compressor, an inlet control valve;
downstream of the inlet control valve, a sampling cylinder that includes an inlet quick-fitting valve and an outlet quick-fitting valve at either end of the cylinder, wherein an inlet quick-fitting valve is in fluid communication with the inlet control valve and the outlet quick-fitting valve is in fluid communication with an outlet control valve;
a downstream tubing line fluidly connects the outlet control valve to a downstream process line;
a control system communicably coupled to and programmed to operate the compressor, the inlet control valve, and the outlet control valve;
wherein, once the sampling cylinder is in place, the control system first opens the inlet control valve, then opens the outlet control valve, then starts the compressor, then closes the outlet control valve, and then stops the compressor and closes the inlet control valve.

2. The automated vacuum sampling system of claim 1, wherein the control system is able to monitor and control the time between opening the outlet control valve and starting the compressor.

3. The automated vacuum sampling system of claim 1, wherein the control system is able to monitor and control the time between starting the compressor and closing the outlet control valve.

4. The automated vacuum sampling system of claim 1, wherein there is a pressure gauge monitoring the pressure within the sampling cylinder and wherein stopping the compressor and closing the inlet control valve is based on the pressure within the sampling cylinder.

5. The automated vacuum sampling system of claim 1, wherein there is a detector at or near the outlet control valve.

6. The automated vacuum sampling system of claim 5, wherein the detector monitors for a lower explosive limit, a potentially harmful substance, or a combination thereof.

7. The automated vacuum sampling system of claim 1, wherein the inlet control valve and the outlet control valve are selected to minimize or eliminate sparking upon operation.

8. The automated vacuum sampling system of claim 1, wherein the downstream process line connects to a flare system.

9. A method of operating an automated vacuum sampling system comprising:
placing a sampling cylinder in between an inlet control valve and an outlet control valve;
wherein, upstream of the inlet control valve is a compressor in fluid communication with an upstream process line and wherein, the outlet control valve is in fluid communication with a downstream process line;
wherein the inlet control valve, the compressor, and the outlet control valve controlled by a control system communicably coupled to and programmed to operate the compressor, the inlet control valve, and the outlet control valve;
then opening the inlet control valve;
then opening the outlet control valve;
then starting the compressor to purge material from the upstream process line through to the downstream process line;
then closing the outlet control valve to fill the sampling cylinder with material from the upstream process line;
then stopping the compressor and closing the inlet control valve to remove the fluid connection between the inlet control valve, the sampling cylinder, and the outlet control valve.

10. The automated vacuum sampling system of claim 9, wherein the control system is able to monitor and control the time between opening the outlet control valve and starting the compressor.

11. The automated vacuum sampling system of claim 9, wherein the control system is able to monitor and control the time between starting the compressor and closing the outlet control valve.

12. The automated vacuum sampling system of claim 9, wherein there is a pressure gauge monitoring the pressure within the sampling cylinder and wherein stopping the compressor and closing the inlet control valve is based on the pressure within the sampling cylinder.

13. The automated vacuum sampling system of claim 9, wherein there is a detector at or near the outlet control valve.

14. The automated vacuum sampling system of claim 13, wherein the detector monitors for a lower explosive limit, a potentially harmful substance, or a combination thereof.

15. The automated vacuum sampling system of claim 9, wherein the inlet control valve and the outlet control valve are selected to minimize or eliminate sparking upon operation.

16. The automated vacuum sampling system of claim 9, wherein the downstream process line connects to a flare system.

* * * * *